Jan. 7, 1936.　　　H. F. MAYNES　　　2,027,053
FISHING REEL
Filed Aug. 13, 1934
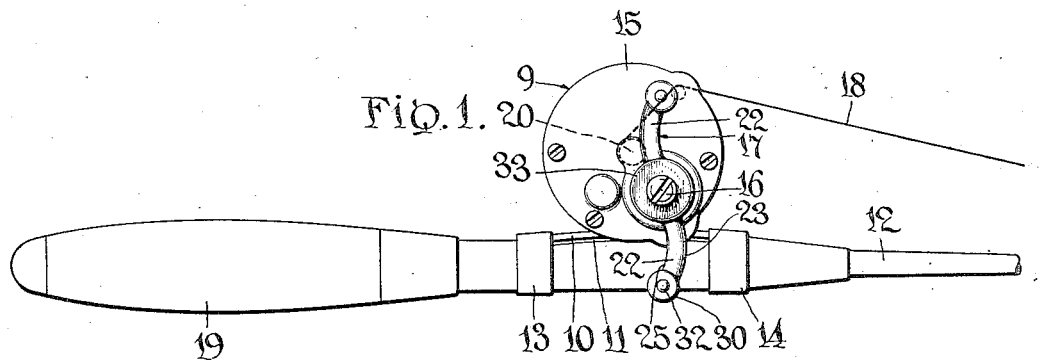
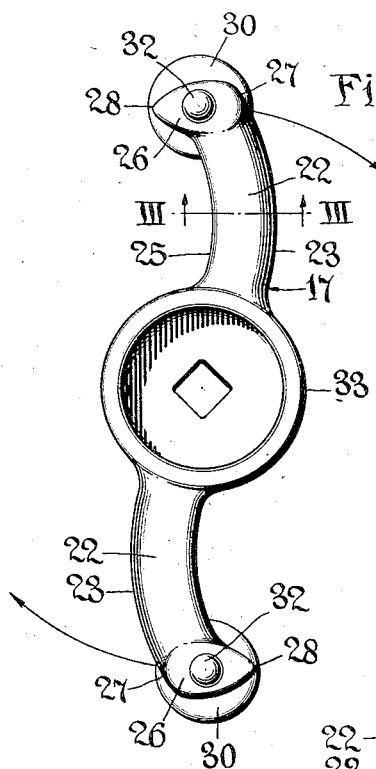
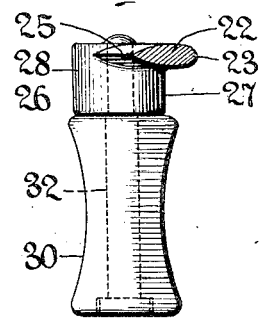
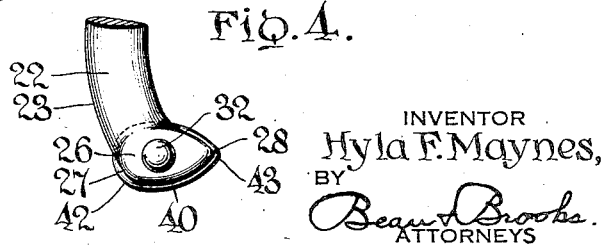
INVENTOR
Hyla F. Maynes,
BY
Beau Brooks
ATTORNEYS Patented Jan. 7, 1936

2,027,053

UNITED STATES PATENT OFFICE 2,027,053

FISHING REEL

Hyla F. Maynes, North Tonawanda, N. Y., assignor of one-half to Emma C. Maynes, North Tonawanda, N. Y.

Application August 13, 1934, Serial No. 739,698

3 Claims. (Cl. 242—84.1)

This invention relates to fishing reels and it has particular relation to the structural form of operating parts of the reels.

This application is a continuation in part of my copending application Serial No. 732,372, for Fishing reel, filed June 25, 1934, and maturing into Patent No. 1,973,686, dated September 11, 1934.

One of the principal objects of the invention is to provide a fishing reel having a winding crank of such form and structure as to offer minimum atmospheric resistance during rotation of the crank.

In the construction of fishing reels of the general type at present being used by anglers, the crank for winding fishing lines upon the reel spool is either provided with one handle and a portion to balance this handle, or is provided with oppositely extending arms which balance each other about the bearing support of the crank. These crank portions are rotated somewhat slowly when the fishing line is being reeled in because of the natural physical limitations for speed of the angler's hand. Hence, atmospheric resistance to the crank rotation is negligible. However, when the line is being played out or when the angler is casting, the crank rotates at great speed and the atmospheric resistance increases proportionally to the increase in speed and to such extent as to be an important factor in attaining the maximum distance in lure casting.

The practice of this invention results in the reduction of the atmospheric resistance to rotation of the crank to a minimum. This advantageous feature is accomplished by streamlining the reel crank surfaces in such manner as to have the leading edge of the streamlining contour facing in a direction corresponding to the direction of rotation of the crank when the fishing line is being reeled out or during lure casting operations.

In the drawing:

Fig. 1 is a fragmentary side elevation of a fishing rod having a reel, constructed according to the invention, mounted thereon;

Fig. 2 is a side elevation, on a larger scale, of a reel crank streamlined according to the invention;

Fig. 3 is a cross section taken substantially along the line III—III of Fig. 2; and Fig. 4 is a fragmentary side elevation of a crank arm showing another form of end construction.

A reel 9 including the improvements of the invention is provided with a saddle 10 rigidly mounted thereon and carried in an operative position upon a seating portion 11 of a rod 12. Suitable fastening devices 13 and 14 demountably secure the saddle upon the seating portion of the rod at a location conveniently spaced from the rear or handle 19 of the rod.

The reel 9 comprises a frame 15 in which a shaft 16 is journalled for rigid connection to a double arm crank 17 that is operable to wind a fishing line 18 upon a suitable spool shaft 20. A showing of the gearing for transmission of power from the crank 17 to the spool shaft 20 is omitted in the specification because it is not material to the particular invention disclosed herein, and is fully shown and described in the parent application which is a continuation in part previously referred to.

As best shown in Figs. 2 and 3, the double crank 17 is formed with arms 22 extending in opposite directions from the shaft 16 and the shank portion of each arm is streamlined to form a leading edge 23 and a trailing edge 25. At opposite end portions of the crank, integral handle portions 26 are angularly disposed with respect to the shank of the crank and are also streamlined to provide leading edges 27 and trailing edges 28.

In rotating the crank in a counter-clockwise direction, as viewed in Fig. 1, the leading edges 23 and 27 offer minimum air resistance, and this air resistance becomes an important factor when the crank is spinning at a rapid rate; for example, incidental to lure casting, especially in tournaments where accuracy and distance become more important. Roller handles 30 are journalled upon pins 32 that are rigidly carried in the streamlined handle portions 26 and facilitate manual rotation of the crank to reel in the fishing line.

A central portion 33 of the crank 17 is pressed out in cup shape with the outside bottom portion of the cup configuration facing outwardly, and, hence, the shank portions of the crank lie relatively close to the adjacent surface of the reel frame. This arrangement provides advantageous compactness of the structure.

Although the roller handles are shown to be round, it is apparent that they can be streamlined in harmony with the streamlining of the other portions of the crank. In this connection, a handle structure is shown in Fig. 4 in which each crank arm 22 is provided with a pivotal streamlined handle 40 which corresponds in shape substantially to the shape of the rigid handle portion 26. In rotatably mounting the handle 40 upon the arm 22 the pin 32 upon which it is carried is offset from the central portion of the handle 40 in such manner that centrifugal force generated in the rotating crank will maintain the handle 40 in substantially the same relative position as the rigid portion 26 shown in Fig. 2. Thus the leading edge 42 is rounded and trailing edge 43, which tapers to a relatively narrow extremity, are in such position to secure the minimum air resistance during rotation of the crank in the manner previously described.

Although only one form of the invention has been shown and described in detail, it will be apparent to those skilled in the art that the invention is not so limited but that various changes may be made therein without departing from the spirit of the invention or from the scope of the appended claims.

I claim:

1. In a fishing reel structure, means for winding a fishing line on said structure, a crank connected to said means for manually winding in a fishing line, and a handle pivotally mounted upon each end of the crank, said crank and pivotal handle each having a rounded edge portion facing the direction of rotation when the reel is rotating in a direction to play out the line and each having a tapering edge portion opposite the rounded edge portion, each crank handle having its pivotal connection eccentrically arranged to maintain the rounded edge portion thereof facing in the direction of rotation when the crank is spinning.

2. In a fishing reel structure, a rotatable reel driving crank having handle portions thereon, handle rollers mounted on the crank portion, said crank and handle portions each having a rounded edge portion facing in the direction of rotation of the crank when the line of the reel is being unwound and each having an opposite edge portion tapering to a relatively narrow extremity.

3. In a fishing reel structure, means for winding a fishing line in the structure, a rotatable crank connected to said means for operating the latter, said crank including a handle portion arranged approximately at a right angle to the body of the crank, said handle having a rounded edge portion normally facing in the direction of rotation of the crank when the fishing line is being unwound from the reel and having an opposite edge portion tapering to a relatively narrow extremity, the edge portions being joined by surfaces merging uniformly therewith.

HYLA F. MAYNES.